United States Patent [19]

Kinlen et al.

[11] Patent Number: 5,532,025
[45] Date of Patent: Jul. 2, 1996

[54] CORROSION INHIBITING COMPOSITIONS

[76] Inventors: Patrick J. Kinlen, 1348 Remington Oaks Ter., Fenton, Mo. 63026; David C. Silverman, 14314 Strawbridge Ct., Chesterfield, Mo. 63017; Edward F. Tokas, 6 N. Tealbrook, St. Louis, Mo. 63141; Christopher J. Hardiman, 534 West Dr., St. Louis, Mo. 63130

[21] Appl. No.: 96,661

[22] Filed: Jul. 23, 1993

[51] Int. Cl.$^6$ .............................. C23F 13/00; C09D 5/08
[52] U.S. Cl. ................... 427/388.1; 427/409; 427/410; 106/14.37; 106/14.34; 106/14.41; 106/14.42; 252/500
[58] Field of Search ................ 106/14.05, 14.16, 106/14.42, 14.43, 14.34, 14.37, 14.41, 14.42; 428/413, 458–466, 421; 252/387, 500, 327, 388.1, 409, 410; 427/327, 388.1, 409, 410

[56] References Cited

U.S. PATENT DOCUMENTS

| | | | |
|---|---|---|---|
| 3,419,537 | 12/1968 | Rembaum et al. | 526/181 |
| 3,849,141 | 11/1974 | Palm et al. | 106/141.11 X |
| 4,559,112 | 12/1985 | Tamamura et al. | 205/50 |
| 4,581,395 | 4/1986 | Nakaya et al. | 523/410 |
| 4,678,601 | 7/1987 | Ham et al. | 252/500 |
| 4,690,962 | 9/1987 | Clark et al. | 524/94 |
| 4,818,777 | 4/1989 | Braig | 524/83 |
| 4,851,487 | 7/1989 | Yaniger et al. | 525/540 |
| 4,927,897 | 5/1990 | Kawata et al. | 526/240 |
| 4,960,761 | 10/1990 | Yodice | 502/159 |
| 4,983,690 | 1/1991 | Cameron et al. | 525/436 |
| 5,021,489 | 6/1991 | Knight et al. | 524/140 |
| 5,069,820 | 12/1991 | Jen et al. | 252/500 |
| 5,093,033 | 3/1992 | Feldhues et al. | 252/500 |
| 5,098,938 | 3/1992 | Savin | 523/220 |
| 5,109,070 | 4/1992 | Epstein et al. | 525/189 |
| 5,120,472 | 6/1992 | Shikatani et al. | 252/500 |
| 5,134,177 | 7/1992 | Aklonis et al. | 523/201 |
| 5,137,991 | 8/1992 | Epstein et al. | 525/540 |
| 5,139,703 | 8/1992 | Jen et al. | 252/500 |
| 5,147,913 | 9/1992 | MacDiarmid et al. | 524/104 |
| 5,152,929 | 10/1992 | Bentley et al. | 252/391 |
| 5,158,707 | 10/1992 | Vestberg et al. | 252/500 |
| 5,160,457 | 11/1992 | Elsenbaumer | 252/500 |
| 5,164,465 | 11/1992 | Epstein et al. | 525/540 |
| 5,183,842 | 2/1993 | O'Neil et al. | 524/288 |
| 5,188,766 | 2/1993 | Eiffler | 252/500 |
| 5,225,058 | 7/1993 | Bazzoni et al. | 204/196 |
| 5,232,631 | 8/1993 | Cao et al. | 252/500 |
| 5,233,000 | 8/1993 | Yodice | 526/258 |
| 5,264,157 | 11/1993 | Bidan et al. | 252/519 |

FOREIGN PATENT DOCUMENTS

| | | |
|---|---|---|
| 2088826 | 6/1993 | Canada . |
| 0217081 | 4/1987 | European Pat. Off. . |
| WO89/02155 | 3/1989 | European Pat. Off. . |
| 0497514A1 | 1/1992 | European Pat. Off. . |
| WO92/20072 | 11/1992 | European Pat. Off. . |
| 2679240 | 1/1993 | France . |
| 9314166 | 7/1993 | WIPO . |
| WO93/14166 | 7/1993 | WIPO . |

OTHER PUBLICATIONS

V. G. Kulken, W. R. Mathew, J. C. Campbell, C. J. Dinkins and P. J. Durbin; Processable Intrinsically Conductive Polymer Blends; Journal of Vinyl Technology Jun. 1992, vol. 14, No. 2.

Karen G. Thompson, Coleman J. Bryan, Brian C. Benicewicz, Debra A. Wrobleski; Corrosion–Protective Coatings from Electrically Conducting Polymers; Los Alamos National Laboratory.

David W. DeBerry and Alfred Viehbeck; Properties of Active/Passive Metals Modified by Electroactive Coatings; SumX Corporation.

David W. DeBerry; Modification of the Electrochemical and Corrosion Behavior of Stainless Steels with an Electroactive Coating; SumX Corporation, vol. 132, No. 5; May 1985.

S. Ren and D. Barkey; Electrochemically Prepared Poly (3–Methylthiophene) Films for Passivation of 430 Stainless Steel; Journal of the Electrochemical Society; vol. 139, No. 4, Apr. 1992.

G. Troch–Nagels, R. Winand, A. Weymeersch, and L. Renard; Electron Conducting Organic Coating of Mild Steel by Electropolymerization; Journal of Applied Electrochemistry 22 pp. 756–764; Jul. 9, 1991; revised Oct. 25, 1991.

S. Samhyanarayanan, S. K. Dhawan, D. C. Trivedi, and K. Balakrishnan; Soluble Conducting Poly Ethoxy Aniline as an Inhibitor for Iron in HCl; Corrosion Science, vol. 33, No. 12, pp. 1831–1841, 1992.

Zhi Deng, William H. Smyrl, and Henry S. White; Stabilization of Metal—Metal Oxide Surfaces Using Electroactive Polymer Films; Journal of the Electrochemical Society, vol. 136, No. 8, Aug. 1989.

Zhi Deng and William H. Smryl; Application of Electroactive Films in Corrosion Protection (II. Metal Hexacyanometalate Films on TiO$_2$/Ti Surfaces); Journal of the Electrochemical Society, vol. 138, No. 7, Jul. 1991.

F. Beck, Duisburg; A Novel Way to Corrosion Protection: The Electrochemical Deposition of Conducting Polymers; metalloberflaeche 46(4), 177–82 (1992).

*Primary Examiner*—Gary Geist
*Assistant Examiner*—Valerie Fee
*Attorney, Agent, or Firm*—Howell & Haferkamp

[57] ABSTRACT

A corrosion inhibiting composition is provided. The composition comprises an intrinsically conductive polymer, e.g. polyaniline or polypyrrole, blended in a binder material, preferably a non-thermoplastic matrix, the blend being capable of adhering to a metal surface to provide enhanced corrosion resistance to the metal. The blend provides corrosion resistance in a variety of corrosive environments such as acidic, alkaline, and salt environments. A method for protecting metal surfaces from corrosive attack by applying the corrosion inhibiting composition is provided, as well as two component corrosion inhibiting coatings, corrosion inhibited thin films of metal adhered to an intrinsically conducting polymer containing substrate, and corrosion inhibited metal bilayers.

6 Claims, No Drawings

CORROSION INHIBITING COMPOSITIONS

BACKGROUND OF THE INVENTION

(1) Field Of The Invention

The present invention generally relates to corrosion inhibiting compositions, and more particularly to corrosion inhibiting coating compositions that employ blends of an intrinsically conducting polymer and an adhesive polymer.

(2) Description Of The Related Art

Corrosion is a problem associated with virtually all metal objects that are exposed to the environment or subjected to harsh environmental conditions. The effects of corrosion are particularly noticeable in automobiles, ships, aircraft, heavy machinery and bridges. Corrosion is also problematic in the road construction industry, various industrial processes and the medical industry.

Metal that is, exposed to harsh environmental conditions, such as a high salt concentration or an acidic or basic environment, is subject to the corrosive effects of the environment which, after prolonged or extreme exposure, can cause a breakdown of the metal and compromise its structural integrity. Various corrosion inhibiting compositions have been developed to inhibit the effects of corrosion. Conventional corrosion resistant compositions employ a protective coating that is applied onto the exposed surfaces of the metal object which serves to provide a barrier to environmental attack. The protective coating is typically composed of a synthetic resin or inorganic silicate polymer which provides a continuous coating that will resist corrosive industrial or environmental conditions. Of course, it is essential that the protective coating be capable of adhering to the metal surface. Examples of corrosion inhibiting compositions include polymeric coatings, such as epoxies, acrylics and lacquers, and conventional primers or paints. The coating can comprise simply the polymeric composition or it can include corrosion inhibiting compounds together with the polymer to provide further corrosion resistance. Numerous non-polymeric corrosion inhibiting compositions are known and disclosed, for example, in U.S. Pat. No. 5,152,929 which discloses novel thio(cyclo)alkanepolycarboxylic acids containing heterocyclic substituents, U.S. Pat. No. 4,818,777 which discloses phenolic corrosion inhibitors for coating materials, U.S. Pat. No. 5,098,938 which discloses a multi-component coating composition, U.S. Pat. No. 5,021,489 which discloses a multi-component corrosion inhibiting coating composition, and U.S. Pat. No. 5,183,842 which discloses corrosion resistant surface coatings.

The application of a corrosion inhibiting coating onto a metal object is, however, not a complete solution to corrosion because most coatings are subject to cracks, chips, or scratches which expose the bare metal to the corrosive environment. Even the existence of pinhole size discontinuities in a coating can be problematic. It has been observed that the effects of corrosion at discrete locations as a result of a chip or a scratch can be particularly severe because the effects of the corrosive elements are concentrated at the point of exposure. Accordingly, conventional corrosion inhibiting compositions are not completely satisfactory in providing corrosion resistance to metal objects.

Intrinsically conducting polymers (ICP), organic polymers that have poly-conjugated π-electron systems, have been proposed as potential corrosion inhibiting compositions for metals. Such polymers have not heretofore been considered suitable as protective coatings because of the intractable nature of the intrinsically conducting polymers. That is, the class of ICPs lack the necessary properties, such as adherence, processability and stability, to be acceptable for use as a protective coating on a metal object. Others have attempted to improve the processability of ICPs by blending them with thermoplastic polymers, such as described in European Patent Application No. 0 497 514 A1, or by sulfonating the ICP as described in U.S. Pat. No. 5,109,070. Recently, a report has also been published disclosing the use of a layer of a functionalized ICP, neat polyaniline, overcoated with an epoxy layer to protect steel from corrosion. This report did not address the problem of the lack of adherence properties of the intrinsically conducting polymer and the performance of the coating composition disclosed is inconclusive. To be commercially useful as a protective coating, it is necessary that the ICP be able to adhere to a metal surface while maintaining its corrosion inhibiting properties.

Therefore, a substantial need exists for a means to utilize ICPs in a coating composition for the prevention of corrosion of metal surfaces.

SUMMARY OF THE INVENTION

The present invention is, therefore, directed to novel corrosion inhibiting compositions, corrosion inhibited metal surfaces coated with the corrosion inhibiting compositions and methods for providing corrosion resistance to metal objects. In one significant aspect, the present invention provides a coating composition adapted for inhibiting corrosion on a metal surface comprising an intrinsically conducting polymer blended with a binder material, preferably a non-thermoplastic matrix, capable of adhering to a metal surface. In another aspect, a two component corrosion inhibiting coating for a metal surface comprising a first layer of an intrinsically conducting polymer blended with a binder material that is capable of adherence to a metal surface and a second layer of a polymeric resin applied over and substantially covering the first layer. This two component coating is capable of adhering to a metal surface and providing corrosion protection to exposed areas of the metal surface. Preferably, the first layer comprises intrinsically conducting polymer in a non-thermoplastic matrix and the second layer is different than the first layer. For instance, the second layer can be devoid of intrinsically conducting polymer or a thermoplastic matrix containing ICP.

The present invention is also directed to a corrosion inhibited thin film of metal having an exposed surface where the metal film is adhered to an intrinsically conducting polymer-containing substrate.

The present invention is further directed to a corrosion inhibited bilayer of exposed metal surfaces comprising an interlayer of an intrinsically conducting polymer-containing matrix presented between and adhered to the non-exposed surfaces of the metal layers.

The present invention is further directed to methods for inhibiting corrosion on a metal surface or object by applying a coating of a blend of an intrinsically conducting polymer and a binder material, preferably a non-thermoplastic matrix, the blend being capable of adhering to the metal surface. The coating can be applied over the exposed surfaces of the metal object, as an underlaying substrate adhering to the non-exposed surfaces of a thin film of a metal, or as an interlayer between a pair of exposed metal surfaces. The method may optionally include the application of a topcoat of a binder material, preferably a polymeric resin, substantially covering the blend coating layer.

The present invention is also directed to the provision of an electronic device, such as an electrocardiograph lead, or conductive circuitry, coated with the blend of an intrinsically conducting polymer and a binder material of the present invention, the blend being capable of adherence to the metal surface of the device while maintaining the electrical conductivity thereof. A topcoat of a corrosive compound may further be applied over the blend coating to provide a means and a method for protecting a metal surface from corrosion where the use of the metal surface requires a corrosive topcoat for its operation.

Among the many advantages found to be achieved by the present invention may be noted the provision of a corrosion inhibiting composition that is capable of providing corrosion protection even in the presence of gaps in the coating on the metal surface or object; the provision of a coating composition utilizing a blend of an intrinsically conducting polymer and a binder material that can be directly applied to a metal surface and adequately adhere thereto and provide corrosion inhibiting properties to the metal; the provision of a corrosion inhibiting composition that can be applied as a thin film over a metal surface to provide corrosion inhibiting properties thereto; the provision of a corrosion inhibiting composition that can be applied below a thin film of metal and provide corrosion resistance to the exposed metal surface; and the provision of a coating which is capable of providing corrosion resistance under a variety of harsh environmental conditions including exposure to a corrosive salt concentration, an acidic environment, or an alkaline environment.

DETAILED DESCRIPTION OF THE PREFERRED EMBODIMENTS

In accordance with the present invention, it has been discovered that corrosion resistance can be provided to a metal surface or object exposed to a corrosive environment by applying a coating of a blend of an intrinsically conducting polymer and a binder material, preferably a non-thermoplastic matrix, the blend being capable of adherence to the metal surface. Surprisingly, the corrosion inhibiting properties of such a coating continues to be provided to the metal surface or object even when a portion of the coating has been removed from the metal surface such as by a scratch or pinhole to expose bare metal. Conventional protective coatings do not provide protection in areas where there is no coating or where the coating has been damaged to expose bare metal to the environment. The blend of an intrinsically conducting polymer and a binder material according to the present invention is capable of being directly applied to a metal surface, by painting or the like, and remaining sufficiently adhered thereto to provide corrosion resistance. Thus, while intrinsically conducting polymers have been suggested as a potential corrosion inhibiting composition because of their intrinsic electrical properties, a problem remained in the practical application of such compositions because of the intractable nature of the intrinsically conducting polymers and their inability to sufficiently adhere to a metal surface. A practical and useful composition employing an intrinsically conducting polymer blended with a binder material has now been discovered that overcomes such problems. It has also been found, surprisingly, that the blend of an intrinsically conducting polymer and a binder material of the present invention maintains its ability to provide corrosion resistance even in strongly alkaline environments where it would have been suggested that the intrinsically conducting polymer would become deprotonated and would not be capable of providing any corrosion inhibiting properties. This surprising discovery provides the coating industry with a corrosion inhibiting composition that can be used in almost any environment and eliminates the need for different coatings for different environmental applications. Moreover, it has been discovered that an intrinsically conducting polymer is capable of providing corrosion inhibiting properties to a thin film of metal deposited on a substrate where a layer of an intrinsically conducting polymer is provided below the thin film of metal and adhered to the non-exposed surfaces of the thin film of metal or blended with the substrate. The intrinsically conducting polymer layer is applied to the substrate and the thin film of metal deposited by conventional methods thereon. A layer of an intrinsically conducting polymer can also be used as an interlayer between a pair of metal surfaces to provide corrosion protection thereto. Thus, the corrosion inhibiting compositions of the present invention need not necessarily cover the metal surface desired to be protected in certain situations, such as when a thin film of metal is being used.

The coating compositions of this invention have utility in a wide variety of industries and applications including the automobile, aircraft and shipping industry as a corrosion inhibiting primers or surface coatings, the bridge and road construction industry as a coating for exposed steel on bridges or as a coating for rebar, the building construction industry as a coating for structural steel, chemical and industrial manufacturers as a coating for metallic machines, vessels, chambers and the like, and the medical industry as a protective coating for metal leads in electrocardiographs and the like. The compositions are also useful for various applications in the metallized textile industry.

Thus, corrosion inhibiting compositions and methods for providing corrosion resistance to metal objects have been discovered. It is believed that according to the invention, virtually any intrinsically conducting polymer can be used. As used herein, by "intrinsically conducting polymer" is meant any polymer that is capable of conducting an electrical current therethrough in at least one valence state of the polymer. Generally, intrinsically conducting polymers are organic polymers that have poly-conjugated $\pi$-electron systems. Examples of suitable intrinsically conducting polymers for use in connection with the present invention include polyaniline, polypyrrole, polythiophene, poly (3-alkyl-thiophenes) such as poly (3-hexyl thiophene), poly (3-methyl thiophene) and poly-(3-octyl thiophene), polyisothianapthene, poly-(3-thienylmethylacetate), polydiacetylene, polyacetylene, polyquinoline, polyheteroarylenevinylene, in which the heteroarylene group can be thiophene, furan or pyrrole, poly-(3-thienylethylacetate), and the like, and derivatives, copolymers and mixtures thereof. Some intrinsically conducting polymers exhibit the electrically conductive property naturally while others must be doped or charged to the proper valence state. ICPs typically exist in various valence states and are reversibly convertible into the various states by electrochemical reactions. For example, polyaniline can exist in numerous valence states such as a reduced state (leucoemeraldine), a partially oxidized state (emeraldine) and a fully oxidized state (pernigraniline). Polyaniline is most conductive in its emeraldine form (+2 electrons). This partially oxidized state of polyaniline can be formed by doping polyaniline with a suitable dopant to increase the electrical conductivity of the polymer. Examples of suitable dopants include tetracyanoethylene (TCNE), zinc nitrate, p-toluenesulfonic acid (PTSA) or any suitable mineral or organic acid. It should be understood that the intrinsically conducting polymer selected for use in connection with the present invention can be provided in either a doped or an undoped form before it is blended with a binder material or before it is applied to a metal surface or object. If applied in an undoped state, the polymer must be doped or similarly treated to establish the necessary and appropriate electrical conductivity of the ICP so that it is capable of imparting its corrosion resistance properties to the metal surface or object. In a preferred embodiment, the ICP is polyaniline, e.g. doped with p-toluenesulfonic acid, polypyrrole or poly (3-methyl thiophene).

To impart suitable adherence properties to the composition of the present invention so that it is capable of adherence to a metal surface or object, it has been discovered that an intrinsically conducting polymer can be blended with a binder material without adversely affecting the corrosion inhibiting properties of the ICP. As previously described, most ICPs, and polyaniline in particular, do not have acceptable adherence properties to permit them to be used directly as a coating on a metal surface. The ICPs tend to quickly and easily delaminate from a metal surface to which they have been applied and, therefore, tend to peel away from the surface. The composition of the present invention is capable of direct application to a metal surface or object and will adhere sufficiently to the metal substrate such that it is not removed in a standard adhesion test such as ASTM Test #D3359, which generally involves scribing an "X" or a series of cross-hatches in the layer of coating to expose the bare metal, applying adhesive tape to the scribed portion, removing the adhesive and observing if any of the coating layer is removed and comparing the amount of coating that is removed to a standard classification table for the adhesion test as designated in ASTM Test #D3359, or other adhesion test accepted by the coatings industry. Any binder material capable of providing the necessary adherence properties to the blend and capable of being blended with the intrinsically conducting polymer can be used in connection with the present invention.

The binder material may be any material which converts to a dense, solid, adherent membrane on a metal surface and preferably provides a non-thermoplastic matrix for the ICP blended therein, e.g. dissolved or dispersed in separate or continuous phases therein. The binder material may be an inorganic compound such as a silicate, a zirconate, or a titanate or an organic compound such as a polymeric resin. Exemplary organic resins include shellac, drying oils, tung oil, phenolic resins, alkyd resins, aminoplast resins, vinyl alkyds, epoxy alkyds, silicone alkyds, uralkyds, epoxy resins, coal tar epoxies, urethane resins, polyurethanes, unsaturated polyester resins, silicones, vinyl acetates, vinyl acrylics, acrylic resins, phenolics, epoxy phenolics, vinyl resins, polyimides, unsaturated olefin resins, fluorinated olefin resins, cross-linkable styrenic resins, crosslinkable polyamide resins, rubber precursor, elastomer precursor, ionomers, mixtures and derivatives thereof, and mixtures thereof with crosslinking agents. In a preferred embodiment of the present invention, the binder material is a cross-linkable binder (a thermoset), such as the epoxy resins, polyurethanes, unsaturated polyesters, silicones, phenolic and epoxy phenolic resins. Exemplary cross-linkable resins include aliphatic amine-cured epoxies, polyamide epoxy, polyamine adducts with epoxy, kerimine epoxy coatings, aromatic amine-cured epoxies, silicone modified epoxy resins, epoxy phenolic coatings, epoxy urethane coatings, coal tar epoxies, oil-modified polyurethanes, moisture cured polyurethanes, blocked urethanes, two component polyurethanes, aliphatic isocyanate curing polyurethanes, polyvinyl acetals and the like, ionomers, fluorinated olefin resins, mixtures of such resins, aqueous basic or acidic dispersions of such resins, or aqueous emulsions of such resins, and the like. Methods for preparing these polymers are known or the polymeric material is available commercially. Suitable binder materials are described in "Corrosion Prevention by Protective Coatings" by Charles G. Munger (National Association of Corrosion Engineers 1984). It should be understood that various modifications to the polymers can be made such as providing it in the form of a copolymer. The binder can be aqueous based or solvent based and can include other corrosion inhibiting compositions such as those disclosed in U.S. Pat. No. 5,152,929, U.S. Pat. No. 4,818,777, U.S. Pat. No. 5,098,938, and U.S. Pat. No. 5,183,842, the entirety of each being incorporated herein by reference hereto.

The binder material can be prepared and subsequently blended with the intrinsically conducting polymer or it can be combined with the intrinsically conducting polymer and treated or reacted as necessary. When a cross-linkable binder is used, the binder may be heated, exposed to ultraviolet light, or treated with the cross-linking component subsequent to the addition of the ICP or concurrently therewith. In this manner it is possible to create a coating composition where the intrinsically conducting polymer is cross-linked with the cross-linkable binder.

Cross-linkable binders particularly suitable for this application include the two component cross-linkable polyurethane and epoxy systems as well as the polyvinylbutyral system that is cross-linked by the addition of phosphoric acid in butanol. Typical polyurethane coatings are made by reacting an isocyanate with hydroxyl-containing compounds such as water, mono- and diglycerides made by the alcoholysis of drying oils, polyesters, polyethers, epoxy resins and the like. Typical epoxy coatings are prepared by the reaction of an amine with an epoxide, e.g., the reaction of bisphenol A with epichlorohydrin to produce an epoxide that is then reacted with the amine. A novel blending method could, for example, involve polymerizing polyaniline in a host polymer matrix such as polyvinylbutyral in ethanol followed by reacting the polyvinylbutyral/polyaniline mixture with phosphoric acid in butanol. When epoxies or polyurethanes are used as the host polymer matrix, a blend of polyaniline and the base polymer could be formulated and the cross-linking catalyst added just prior to the coating application. In an alternate embodiment, the ICP is blended with the cross-linking catalyst.

The metal surface or object to be coated with the corrosion inhibiting composition of the present invention can be virtually any metal that is susceptible to corrosion. Thus, virtually all metals and metal alloys can be used in conjunction with the present invention including silver, aluminum, iron, nickel, copper, zinc, cobalt, lead, iron based alloys such as steel, tantalum, titanium, zirconium, niobium, chromium, and the like, and alloys thereof. As will be discussed in more detail hereinafter, the metal surface or object may be provided in virtually any shape or form and includes thin films of metal that have been deposited by sputter deposition or similar methods on a non-metallic substrate.

In the preparation of a blend of an intrinsically conducting polymer and a binder material, the components are blended in a ratio that maintains the binder materials properties relative to adherence to a metal surface while also maintaining the electrical conductivity of the intrinsically conducting polymer so that it is capable of providing its corrosion resistant properties. Preferably, the amount of the intrinsically conducting polymer in the blend is between about 0.1% and 80%, by volume. More preferably, the intrinsically conducting polymer comprises between about 1% and 50%, by volume, of the resulting blend. It should be understood that particular applications may require particular ratios of the intrinsically conducting polymer and the binder in the resulting blend. The optimal relative proportions of the components of the blend depend on the particular components being utilized, the substrate to be coated and the specific technique employed for applying the coating to the substrate. It should also be understood that the intrinsically conducting polymer can be provided "neat" or as a dispersion in an appropriate solvent, typically an organic solvent. In particular, the intrinsically conducting polymer polyaniline can be dissolved in most organic solvents such as 1-methyl-2-pyrrolidinone (NMP). The term "blend" as used herein is meant to include blends of an intrinsically conducting polymer and a binder material where there is no chemical reaction between the two components as well as combinations which involve a chemical reaction between the intrinsically conducting polymer and the binder material. In this regard, "blends" of intrinsically conductive polymers and binder materials include combinations forming interpenetrating networks of an intrinsically conductive polymer and a binder material, as well as emulsions and dispersions of the two components. Furthermore, the ICP can be provided in a doped state or an undoped state and subsequently doped to the desired electrically conductive state.

In one embodiment of the present invention, a two component corrosion inhibiting coating for a metal surface is provided wherein a metal object or surface is coated with a first layer comprising a blend of an intrinsically conducting polymer and a binder as hereinabove described. The blend is applied by painting or spraying onto the metal surface or object to provide a thin layer of the blend coating the metal surface or object. Preferably, the coating is between about 0.1–5 mils in thickness, more preferably between about 1–2 mils. A topcoat comprising a layer of a binder material is subsequently applied over and substantially covering the first coating layer. The topcoat binder material may be the same as the binder material used to produce the blend forming the first coating layer or it may be a different binder. Preferably, the topcoat comprises a conventional corrosion inhibiting barrier composition such as an epoxy, an acrylic or a lacquer or comprises a finish coat containing a pigment to impart desirable aesthetic features to the object.

Intrinsically conducting polymers and blends thereof with binder materials also find utility as a corrosion inhibitor as an underlayer to an exposed metal surface even when applied or adhered to the non-exposed surface of a metal. This is particularly true with respect to thin films of metal that are deposited onto a non-metallic substrate. In this regard, the present method is applicable to any conventional substrate including three-dimensional objects, plates, textiles and fibers. More particularly, non-metallic substrates such as nylon, mylar, aramid fibers and other synthetic fibers and textiles formed thereof are suitable for use in this invention. The intrinsically conducting polymer or blend thereof is applied as part of the catalyst/carrier polymer film that is applied prior to the deposition of the metal layer. The metal layer is typically deposited by the method of electroless deposition which generally is catalyzed by reduced metal sites on the surface to be coated. A variety of techniques for electroless deposition are known in the art, such as those described in U.S. Pat. No. 4,910,072, the entirety of which is incorporated herein by reference hereto, where the carrier polymer is complexed with the catalytic compound and the surface activated by heating. After the metal layer is deposited onto the substrate impregnated with the catalyst/carrier polymer/intrinsically conducting polymer or blend, the non-exposed surfaces of the metal layer are in intimate contact with the metal film and it is believed that the conducting polymer is capable of setting the metal to a potential at which passivation occurs to inhibit corrosion. In this application, the intrinsically conducting polymer can be applied as a solution to the substrate or it can be applied as a blend as hereinabove described. The coating composition of the present invention may also be advantageously used to provide corrosion resistance to articles coated with a catalytic film prepared by thermally activating a catalytically inert film formed from an aqueous solution of a polymer and a Group 8 metal as disclosed in U.S. Pat. No. 5,082,734.

The intrinsically conducting polymer blend described above can also be used as an interlayer between a pair of metal surfaces to provide corrosion resistance to both of the exposed metal surfaces. In this embodiment, the intrinsically conducting polymer blend is "sandwiched" between a pair of metal surfaces and functions to bind the two metal layers together and it is believed that it also serves to set the metal to a potential at which passivation occurs. This embodiment has particularly utility in the aircraft industry where aircraft bodies are typically formed of a plurality of thin metal sheets bonded together. An intrinsically conducting polymer can be incorporated into the adhesive used to bond the sheets together (e.g. SKYBOND 3000) or a blend of an intrinsically conducting polymer with a suitable binder can be prepared and utilized.

A blend of an electrically conducting polymer and a binder as previously described can also be used to protect an electrically conducting metal surface from corrosion without shielding the electrically conducting properties of the metal surface. For example, the metal leads of an electrocardiograph, which are routinely exposed to a high salt concentration in the conducting gel used in connection with attaching the leads to a patient, can be coated with a coating composition of the present invention and remain capable of conducting an electrical current, yet be protected from the corrosive effects of the conducting gel.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples that follow, all percentages are given on a volume basis unless otherwise indicated.

EXAMPLE 1

The following example illustrates the corrosion protection provided by the two component coating composition of the present invention in an acidic environment.

C1018 steel coupons were sand blasted, degreased in a chloroform ultrasonic bath, and brush coated with a dispersion of polyaniline and poly(butylmethacrylate) in butyrolactone obtained from Americhem Inc. and designated 34820-W5. The coupons were allowed to air dry for three hours followed by heating at 60° C. for one hour in an air convection oven. An epoxy topcoat obtained from Carboline Co. (Carboline 890) was then applied according to the manufacturer's instructions. This coating was air dried followed by drying at 60° C. for 12 hours. The coupons were touched up with additional epoxy and dried for an additional 24 hours at 60° C. A 1 cm×1 cm "+" was then scribed through the coating to expose bare metal to simulate a scratch.

Coupons to which the two component coating composition had been applied and control coupons containing only a coating of the Carboline 890 epoxy or the Americhem Inc. polyaniline dispersion or no coating at all were immersed in an aerated 0.1M HCl (pH 1.06) bath at 35° C. for two weeks. At the end of the two week period, the coupons containing the two component coating composition exhibited no corrosion or coating disbondment from the coupon. The control coupons, on the other hand, exhibited various stages of corrosion. The coupon coated only with the epoxy coating exhibited delamination of the coating with underlying General corrosion. The polyaniline coated coupon exhibited blistering of the coating and corrosion beneath the blister as well as other areas of corrosion and non-uniform protection. The uncoated coupon exhibited massive General corrosion throughout the coupon.

EXAMPLE 2

This example illustrates the corrosion inhibiting properties of the two component coating composition of this invention in high salt environments.

C1018 steel coupons were prepared as in Example 1 and were immersed for two weeks in an aerated 3.5% NaCl bath (pH 5.33) at 35° C. The polyaniline/epoxy coated coupon exhibited some minor corrosion and delamination at the site of the scratch, but was overall protected from corrosion. The epoxy coated coupons exhibited a blistered coating and corrosion at the site of the scratch with coating delamination at the scratch. The polyaniline coated coupon exhibited blistering of the coating with corrosion beneath the blister. The uncoated coupon again exhibited massive General corrosion.

EXAMPLE 3

This example illustrates the corrosion inhibiting properties of the two component coating of the present invention in a strongly alkaline environment.

C1018 steel coupons were prepared as described in Example 1 and immersed for two weeks in a 3.5% NaCl/0.1% NaOH bath (Ph 12.38) at 35° C. The epoxy/polyaniline coated coupon exhibited no corrosion or corrosive attack. The epoxy coated coupon exhibited blistering with corrosion under the blisters and coating delamination along the scratch as well as pitting near the scratch. The polyaniline coated coupon exhibited blistering of the coating with corrosion beneath the blister. The uncoated coupon exhibited a large pit caused by local corrosion in addition to other local corrosion.

EXAMPLE 4

This example illustrates the application of an intrinsically conducting polymer as an underlayer to a thin metal film to provide corrosion inhibiting properties thereto.

Nafion 117 was hydrated by boiling 30 minutes in distilled water. A number of small strips were cut from the sheet and soaked in a 10% aqueous ferric chloride solution. The treated sheets were rinsed with distilled water and allowed to air dry. Several of these sheets were then placed in a glass developing Jar containing pyrrole. The Nafion-$Fe^{3+}$ film instantly turned from yellow to blue to black, indicating the formation of polypyrrole. The polypyrrole impregnated Nafion sheets were then rinsed with distilled water and air dried at room temperature. A number of the polypyrrole sheets were then soaked for a few minutes in a solution of palladium acetate (0.6 grams in 10 ml acetone +2 ml water). This step incorporates the $Pd^{2+}$ into the Nafion by ion exchange. A conventional copper electroless deposition bath was then used to electrolessly plate copper onto the samples.

Three samples were then analyzed. Sample 1 comprised Nafion impregnated with polypyrrole with a Pd catalyst and a thin film of copper deposited on the surface of the sheet. This Sample provided a very rapid, bright copper film formation. Sample 2 comprised Nafion impregnated with polypyrrole and a thin film of copper deposited on the surface of the sheet. This Sample exhibited a slow forming, non-uniform copper coating. Sample 3 comprised a Nafion sheet with the Pd catalyst and a film of copper deposited on the surface of the sheet. This Sample exhibited rapid copper film formation, but the film was not as uniform as the film formed in Sample 1.

All three Samples were exposed to the air for 24 hours. Sample 1 maintained its brightness, whereas Sample 3 became dull in appearance. This illustrates the ability of the intrinsically conducting polymer to function as a corrosion inhibiting composition even when applied as an underlayer to a metal surface.

EXAMPLE 5

This example illustrates the use of an intrinsically conducting polymer blended with a binder material as a corrosion inhibiting coating on an automobile.

In Nov. of 1992, a blend of p-toluenesulfonic acid doped polyaniline (from Versicon) dispersed in Carboline 890 epoxy was applied to the exterior surface of a portion of a pick-up truck where the paint had been removed exposing bare metal. The blend was allowed to dry briefly and a portion of the blend coating was then overcoated with an epoxy topcoat (Carboline 890). A scratch was scribed into the coating after it had been allowed to dry. The truck has been used regularly since the date of the application in all temperatures and environmental conditions and no corrosion has been initiated in this portion of the truck.

EXAMPLE 6

This example illustrates the compatibility of a doped polyaniline with various binder materials.

4.0 gm of CarboZinc 11 Base (an inorganic silicate base manufactured by Carboline) was mixed with 1.0 gm of Versicon (Allied Signal Co.) polyaniline. 1.2 gm of thinner was added (Carboline #26) and an additional gram of solvent was added to obtain a consistency suitable for coating.

Two carbon steel coupons were dip coated and air dried at ambient temperature and were then air dried overnight in an air convection oven. Two microscope slides were also coated with the mixture and air dried in a similar manner. The resistance of the coating on the microscope slide was measured and determined to be 4.0KΩ/□.

4.95 gm of a PVB/g-butyrolactone solution was mixed with 8.61 gm of Americhem W5 polyaniline solution. A viscous solution resulted which was diluted with 6.8 gm of g-butyrolactone. A film was cast on a microscope slide using a stirring rod and, after drying overnight, the resistance of the coating on the slide was measured to be 92–93Ω/□. A polyaniline film alone yielded a resistance of 22–23 KΩ/□.

2.85 gm of polyurethane (Minwax Company, Inc. Montvale, N.J.) was mixed with 40 mg of Versicon (purchased from the Allied Signal Co.) polyaniline doped with PTSA. The polyaniline dispersed into the polyurethane and remained green (its protonated state). The material was coated onto a microscope slide using a stirring rod and coated onto one side of a steel coupon and allowed to dry overnight. A clear polyurethane coating formed over the steel coupon.

13.21 gm of Americhem W5 polyaniline was blended with 5.13 gm of G.E. Silicone 994 Varnish. The polyaniline remained in its protonated state as evidenced by its green color after blending. A small amount of the blend was spread on a microscope slide with a stirring rod to form a film which had a measured resistance of 39.125K$\Omega$/□. After overnight drying, a flexible film developed with little or no adhesion to the glass slide. The same solution was coated onto a steel coupon and a smooth green coating was obtained after air drying that adhered to the steel.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method for inhibiting corrosion on a corrodible metal surface in an alkaline environment, said method comprising:

applying a first coating on said metal surface, the coating comprising a composition adapted for inhibiting corrosion on a metal surface, the composition comprising an intrinsically conducting polyaniline blended in a matrix comprising an inorganic silicate or an organic resin capable of adhering to said metal surface; and applying a second coating over the first coating wherein said second coating consists essentially of an inorganic silicate or an organic resin.

2. A method according to claim 1 wherein said corrodible metal surface is iron, steel, copper, aluminum, nickel, zinc, cobalt, lead, chromium, tantalum, titanium, zirconium, silver, niobium or an alloy thereof; and wherein said organic resin is selected from the group consisting of shellac, phenolic resins, alkyd resins, aminoplast resins, epoxy resins, urethane, resins, acrylic resins, unsaturated polyester resins, vinyl resins, silicones, polyimides, unsaturated olefin resins, fluorinated olefin resins, crosslinkable styrenic regins, crosslinkable polyamide resins, rubber, elastomer, ionomers, mixtures thereof and mixtures thereof with crosslinking agents.

3. A method according to claim 2 wherein said corrodible surface is iron, steel, copper, aluminum, nickel, zinc, cobalt, lead, chromium, tantalum, titanium, zirconium, silver, niobium or an alloy thereof.

4. A method for inhibiting corrosion on a corrodible metal surface in an alkaline and salt environment, said method comprising:

applying a first coating on said metal surface, the coating comprising a composition adapted for inhibiting corrosion on a metal surface, the composition comprising an intrinsically conducting polyaniline blended in a matrix comprising an inorganic silicate or an organic resin capable of adhering to said metal surface; and applying a second coating over the first coating wherein said second coating consists essentially of an inorganic silicate or an organic resin.

5. A method according to claim 4 wherein said corrodible metal surface is iron, steel, copper, aluminum, nickel, zinc, cobalt, lead, chromium, tantalum, titanium, zirconium, silver, niobium or an alloy thereof; and wherein said organic resin is selected from the group consisting of shellac, phenolic resins, alkyd resins, aminoplast resins, epoxy resins, urethane, resins, acrylic resins, unsaturated polyester resins, vinyl resins, silicones, polyimides, unsaturated olefin resins, fluorinated olefin resins, crosslinkable styrenic resins, crosslinkable polyamide resins, rubber, elastomer, ionomers, mixtures thereof and mixtures thereof with crosslinking agents.

6. A method according to claim 5 wherein said corrodible surface is iron, steel, copper, aluminum, nickel, zinc, cobalt, lead, chromium, tantalum, titanium, zirconium, silver, niobium or an alloy thereof.

* * * * *